United States Patent [19]

Alfter et al.

[11] 3,962,016

[45] June 8, 1976

[54] PROCESS FOR JOINING ABUTTING THERMOPLASTIC SYNTHETIC-RESIN FOAM SHEETS

[75] Inventors: Franz Werner Alfter, Siegburg; Hans-Ulrich Breitscheidel, Troisdorf, both of Germany

[73] Assignee: Dynamit Nobel Aktiengesellschaft, Germany

[22] Filed: Sept. 16, 1974

[21] Appl. No.: 506,335

[30] Foreign Application Priority Data

Sept. 14, 1973 Germany ........................... 2346373

[52] U.S. Cl. ................................ 156/304; 156/306; 156/320; 156/322; 156/324; 156/497; 156/499; 156/545; 428/58; 428/67; 428/313

[51] Int. Cl.[2] ........................................ B29C 19/00

[58] Field of Search ............ 156/82, 304, 306, 320, 156/321, 322, 324, 544, 545, 497, 499, 554, 298, 301, 302, 303.1; 428/61, 313, 58, 67

[56] References Cited

UNITED STATES PATENTS

| | | | |
|---|---|---|---|
| 2,220,545 | 11/1940 | Reinhardt | 156/322 |
| 2,367,725 | 1/1945 | Lindh et al. | 156/82 |
| 2,372,737 | 4/1945 | Phillips et al. | 156/497 |
| 3,303,954 | 2/1967 | Beaudet et al. | 156/320 |
| 3,348,995 | 10/1967 | Baker et al. | 156/322 |
| 3,650,871 | 3/1972 | Bentfors | 156/304 |
| 3,650,872 | 3/1972 | McKiernan | 156/304 |

*Primary Examiner*—William A. Powell
*Assistant Examiner*—Brian J. Leitten
*Attorney, Agent, or Firm*—Craig & Antonelli

[57] ABSTRACT

A process for joining abutting thermoplastic synthetic resin foam structures by a strip which covers a junction zone formed between the foam structures including the steps of pressing a metal strip heated to above the softening point and or the melting temperature of the synthetic resin foam under slight pressure onto the junction zone and then allowing the metal strip to cool. In this manner, a bond is formed between the foam structures and the metal strip.

11 Claims, 1 Drawing Figure

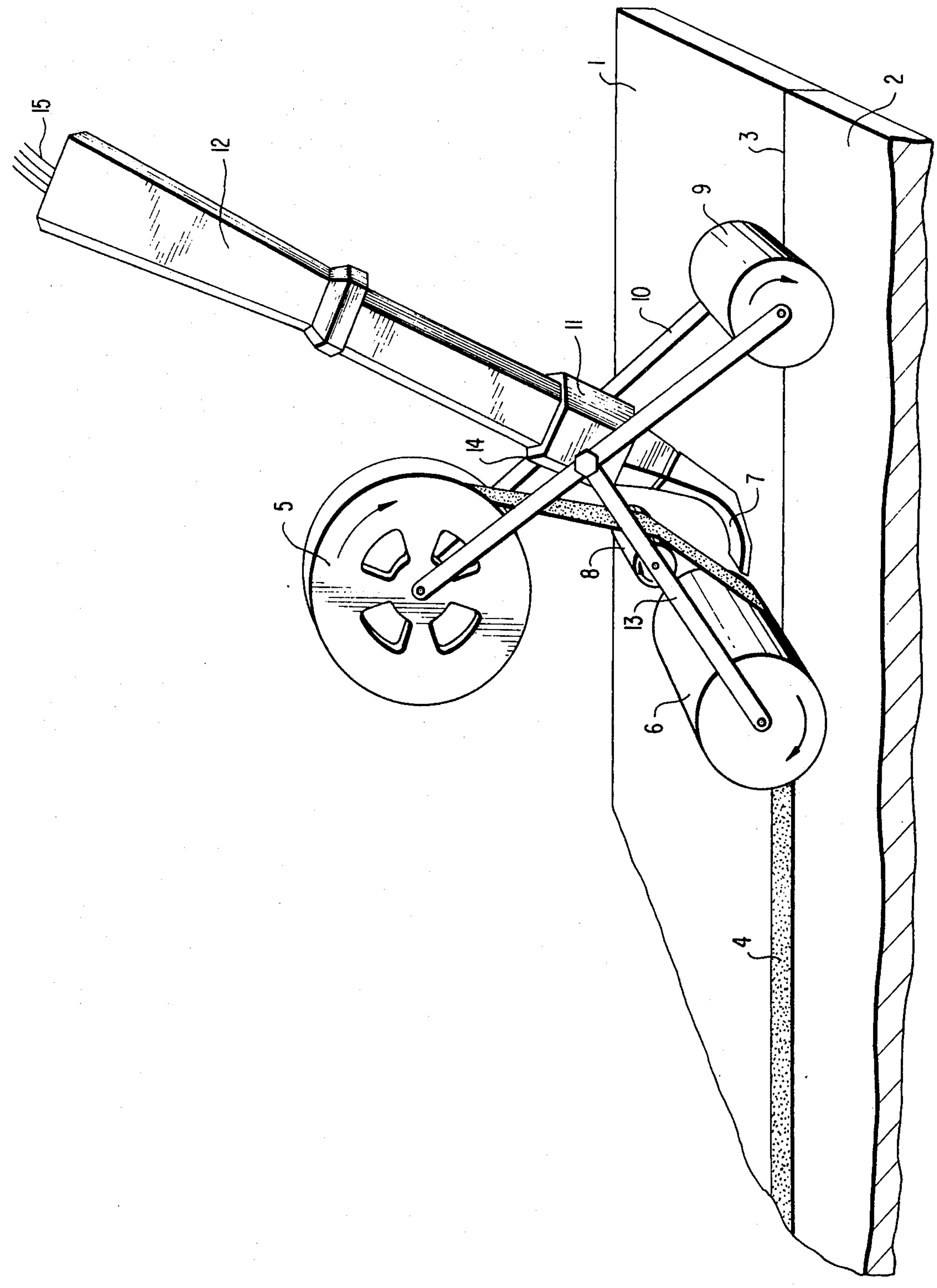
15
12
11
14
5
8
13
6
1
2
3
9
10
7
4

PROCESS FOR JOINING ABUTTING THERMOPLASTIC SYNTHETIC-RESIN FOAM SHEETS

The present invention relates to a process for joining abutting thermoplastic synthetic resin foam sheets or panels, for example partially cross-linked polyethylene foam sheets, with a strip covering the junction zone therebetween.

The joining of sheets, panels or like planar structures of foam material is necessary, for example, at building sites where sheets of foam material are employed, for example, for roof coverings.

A flat roof covering which is satisfactory from the viewpoint of construction technology consists of several layers of different materials, each of which must fulfill a specific task. For several of these layers, synthetic-resin foam sheets, for example, of soft PVC, polystyrene, polyurethane, or partially cross-linked polyethylene, can be utilized very advantageously. The joining of such sheets of foam material to be conducted at the building site requires devices which can be handled particularly easily, and simple methods which are not trouble-prone, in order to extensively eliminate any errors.

It is an object of this invention to provide a process and apparatus fulfilling the above conditions.

The process of this invention for the joining of abutting sheets or panels of foam material is characterized in that a metalfoil strip, heated to above the softening and/or melting temperature of the synthetic resin foam sheets, is pressed under slight pressure onto the junction zone.

By pressing, according to this invention, a heated metal strip under slight pressure onto the foamed sheets or panels abutting along the junction zone, a heat transfer to the foam material is effected, and due to the concomitant itinital melting of the surface of the foam materials, the metal strip is firmly attached in the junction zone. At the same time, a partial connection of the edges of the sheets of foam material with each other is thereby achieved.

The metal foil is advantageously heated by means of hot air, but it is also possible to heat the foil by a gas flame or by electric heating procedures. The heating of the metal strip alone has the advantage that the quality of the bond is not affected, at above the required temperature of, for example, about 220°C., lying above the softening and/or melting point of the foam material in case of partially cross-linked polyethylene foam, by temperature fluctuations due, for instance, to variations in the welding speed. Temperature fluctuations merely have the consequence that the metal strip enters or penetrates the surfaces of the foam material, due to melting, to a somewhat greater or lesser depth.

A suitable strip of metallic foil can be an aluminum strip having a thickness of, for example 0.1 mm. On the side facing the foam material, the metal foil strip can carry a film of an adhesive agent. Suitably, the same synthetic resin is utilized for the adhesiveness-promoting film as is used for the sheet of foam material.

A suitable apparatus for the continuous conductance of the process includes a mounting support for receiving a heating source, a T-shaped linkage attached on both sides of the mounting support in the zone of the junction point of the linkage and mounted at the ends of the T-head a storage roll and a supporting roll, respectively, and at the end of the T-stem, a pressure roll.

In this arrangement, the heating source (a hot-air nozzle, gas flame, etc.) is provided to be effective on the metal strip in the zone between the pressure or contact roll and the supporting roll. Moreover, a guide roller is additionally disposed between the pressure roll and the junction point, i.e. between a point where the metal strip is unreeled from the storage roll and the pressure roll; this guide roller keeps the entering angle of the metal strip onto the sheets of foam material at a constant value.

The invention will be further understood from the accompanying drawing with reference to one embodiment wherein the apparatus is shown in a perspective view.

The sheets or panels 1, 2 of thermoplastic foam material (i.e. foam polyethylene) are joined along the junction zone 3 to the metal strip 4 made of aluminum covering the junction zone. The apparatus for establishing the bond operates as a manual appliance with the handle 12. In the bilateral, T-shaped linkage 10, 13, the mounting support 11, e.g. a hexagonal sleeve, is provided and attached in the zone of the junction point 14. The linkage sections 10 and 13 are rigidly attached to each other at the point of intersection. The sleeve 11 is mounted hingedly, but lockable, to the linkage 10, 13 at the point of intersection, for example by means of screws and nuts. The linkage carries, rotatably mounted thereto, at the end points or ends of the T-forming portion 10, a storage roll 5 made of synthetic resin with a metal strip 4, wound thereof, a supporting roll 9 made of solid plastic or metal, and vertically thereto, at the stem 13 of the T, a pressure roll 6. Roll 6 is a metal roll with a synthetic resin coating, e.g. Teflon, a registered U.S. Trademark of E.I. duPont deNemours and Co., optionally with a textured surface. Additionally, a guide roller 8, made of solid plastic or metal, is arranged in front of the pressure roll 6 on the end of the stem 13 of the T-shaped linkage, which guides the metal strip to keep the entering angle onto the surface of the foam material at a constant value. The supporting roll 9 serves for supporting the apparatus. The heat source 7 for example, a hot-air nozzle of an electrical air heater is attached to the mounting support 11. The heat source is effective on the metal strip 4 in the zone where the strip engages the pressure roll 6. An electrical power supply 15 for the electric heater is extended through the interior of the handle 12 of the heater.

To join the sheets 1, 2 of foam material together, the metal strip 4 is guided over the junction zone 3. The metal strip 4 unreels from the storage roll 5, passes by the guide roller 8, is heated by the hot-air nozzle 7 in front of the pressure roll 6, and is slightly pressed onto the junction zone 3 of the foam sheets by means of the pressure roll 6. During this step, the surface of the foam material is melted due to heat transfer, and a permanent bond is established in a continuous operation which can be accomplished anywhere by means of the apparatus as described by the present invention.

Suitable as foams which can be melted on the surface by supplying heat thereto are, for example, cross-linked and not crosslinked polyethylene foams, polyurethane foams, polystyrene foams. Suitable as material for the metal strip are steel, copper, aluminum, galvanized metals, brass, etc. The thickness of the foam sheets ranges preferably between 3 and 30 mm. but otherwise is arbitrary. The thickness of the metal strip is preferably between 50$\mu$ and 300$\mu$. Thicker strips are too expensive. The strips must still be thin enough to be rolled up, in any event.

It will also be appreciated that the temperature range to initiate the melting process, i.e. the heating of the strip, is at least 200°C., preferably up to 300°C. At still higher temperatures, the strip is too deeply immersed in the foam surface. For the slight pressing operation, a pressure of about 0.1 kp./cm$^2$ (kilopond per square centimeter) is sufficient.

While the novel embodiments of the invention have been described, it will be understood that various omissions, modifications and changes in these embodiments may be made by one skilled in the art without departing from the spirit and scope of the invention.

What is claimed is:

1. A process for joining abutting thermoplastic synthetic resin foam structures having planar peripheral surfaces by a strip covering the junction zone between the foam structures which comprises heating a metal strip to above the softening temperature of the synthetic resin foam, pressing the heated metal strip under slight pressure onto the junction zone and allowing the metal strip to cool whereby a bond is formed between the foam structures and the metal strip.

2. The process according to claim 1, wherein the metal strip is made of aluminum.

3. The process according to claim 1, wherein the metal strip is coated, on the side contacting the junction zone, with a thermally activatable adhesive agent, which adhesive agent is activated during heating of the metal strip.

4. The process according to claim 3, wherein the synthetic resin used for forming the adhesive coating is the same as that for forming the synthetic-resin foam sheet.

5. The process according to claim 1, wherein surfaces of the foam structures beneath the metal strip are melted by said metal strip whereby a permanent bond is formed between said foam structures.

6. The process according to claim 5, wherein the metal strip penetrates within the surfaces of the foam structures.

7. The process according to claim 5, wherein the foam structures are formed of a synthetic resin foam selected from the group consisting of cross-linked and non-cross-linked polyethylene foam, polyurethane foam and polystyrene foam.

8. The process of claim 1, wherein the foam structures have a thickness of from 3 to 30 mm. and the metal strip has a thickness between 50$\mu$ and 300$\mu$.

9. The process of claim 1, wherein the metal strip is thin enough to be rolled up in a storage roll and then unrolled during application to said junction zone.

10. The process of claim 1, further comprising unrolling said metal strip from a storage roll, guiding the metal strip to a pressure roller, heating the metal strip in front of the pressure roller and pressing the metal strip onto said junction zone with said pressure roller.

11. The process of claim 10, wherein the metal strip is heated alone by a heated gas to a temperature of from at least 200°C. to 300°C.

* * * * *